May 16, 1950     V. D. BALLARD ET AL     2,507,950
TOY SCALE
Filed Jan. 27, 1948
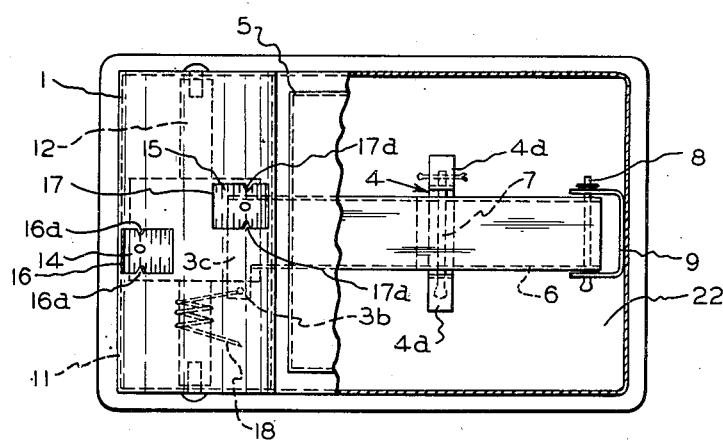
FIG. II.
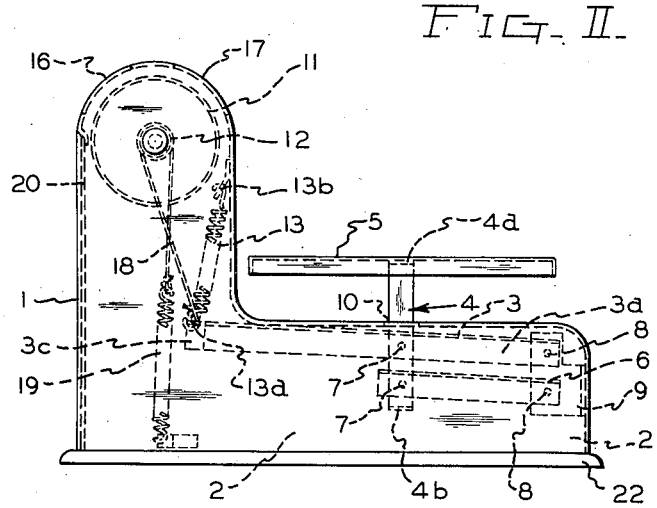
FIG. I.
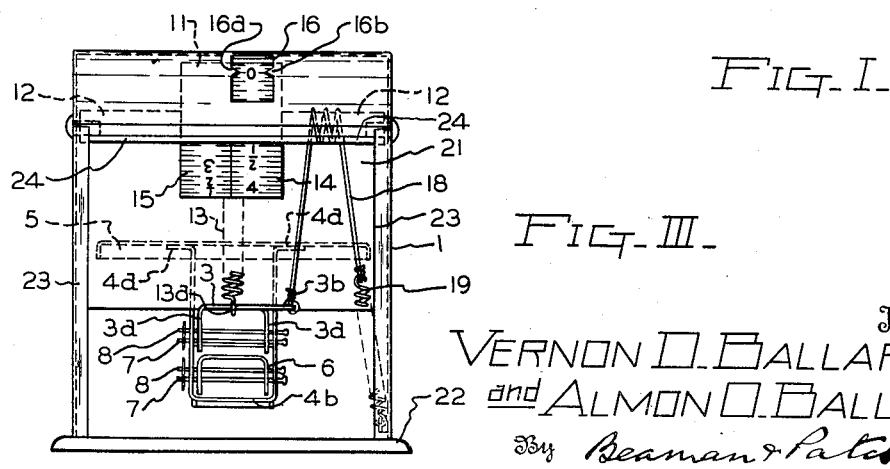
FIG. III.
Inventors
VERNON D. BALLARD
and ALMON D. BALLARD
By Beaman & Patch Patented May 16, 1950

2,507,950

UNITED STATES PATENT OFFICE 2,507,950

TOY SCALE

Vernon D. Ballard, Ferndale, and Almon O. Ballard, Jerome, Mich.

Application January 27, 1948, Serial No. 4,506

3 Claims. (Cl. 265—68)

This invention relates to toy weighing apparatus.

The invention has for its object to provide a miniature and simple construction of weighing apparatus which, while of simple form and construction and usable by children in the playing of stores, etc., nevertheless has an instructional value, since it resembles a conventional weighing apparatus, as employed in shops, stores, and like places, and is able to weigh articles with a fair degree of accuracy within the load weighing limits and correspondingly graduated indicator scale provided.

It is also an object of the invention to provide a miniature or toy form of weighing apparatus which can be constructed almost entirely from sheet metal or like deformable material or which can be constructed from moldable or plastic material.

Thus an object of the invention is to provide a miniature toy weighing apparatus having a casing, weighing platform and weighing beam in the form of sheet metal stampings or pressings or formed from molded plastic material.

Further objects and advantages of the invention will be apparent from a consideration of the following description.

In the accompanying drawings,

Fig. I is a side elevational view of one practical embodiment of the invention with the interior operating parts shown in dotted position, Fig. II is a plan view of Fig. I with a portion of the weighing platform removed and the opposite top portion of the casing broken away to reveal the balance beam, and Fig. III is a rear end view of the weighing apparatus with the back casing panel removed.

Referring to the drawings, a weighing apparatus is shown comprising a hollow casing conveniently made from sheet metal stamped and bent into shape to form an L-shape hollow casing, the limbs of which are of substantially rectangular form, as shown, and are in open communication with one another and which L-shape hollow casing is disposed to provide a hollow vertical pillar 1 and a horizontal base 2.

Mounted within the hollow base 2 there is a balance beam 3 which is of channel section as shown and formed from sheet metal bent into shape to provide the side flanges 3a and, at one end thereof, a laterally projecting ear 3b. The balance beam extends longitudinally and centrally within the hollow base 2 and is pivotally mounted intermediate its ends upon a leg 4 secured to the center of the underneath surface of a weighing platform 5, both leg and platform being also formed from sheet metal with the leg of channel shape as shown particularly in Fig. III and the platform of the form of a shallow inverted rectangular tray.

The leg 4 depends from the weighing platform 5, to which latter the upper end of the leg is secured, as by riveting or welding laterally directed ears 4a thereof to the platform, and the leg is disposed so that its opposite vertical limbs pass on opposite sides of the balance beam and of a correspondingly channel shaped stabiliser link 6, with the bridge portion 4b of the channel shape leg disposed to extend transversely beneath the stabiliser link 6.

Pins 7, extending transversely between the side flanges of the balance beam and the stabiliser link and passed through the vertical limbs of the leg 4, serve pivotally to secure the beam and link upon the leg.

The end of the balance beam remote from the ear 3b is also pivotally mounted, by transverse pivot pins 8, upon a fixed bracket 9 secured upon the inside of the front and closed end wall of the base 2 and the corresponding end of the stabiliser link is also pivotally mounted, by similar transverse pivot pins 8, upon this bracket so as to provide, with the beam, a parallel link motion.

The leg 4 is vertically and freely reciprocable through a clearance opening 10 in the upper and otherwise closed wall of the hollow base 2, whereby the leg is able to transmit to the beam structure the movements of the weighing platform brought about by the placing of a load thereon or the removal of the load. These movements are in turn transmitted by the balance beam to a rotary drum or cylinder 11 carried upon a spindle 12 which is mounted upon the opposite side walls of the vertical hollow casing pillar, so as to extend transversely within the upper portion of this casing leg and deflection of the balance beam 4 takes place against the resistance of a coil spring 13.

The load resistance coil spring 13 is anchored at one end 13a to the center of the end 3c of the balance beam and at its opposite end is anchored to the inside of the front wall of the hollow casing leg 1. The spring 13 serves normally to maintain the balance beam in a substantially horizontal plane but permits angular deflection of the beam to take place upon a load being placed on the weighing platform 5.

The drum or cylinder 11 carries upon its outer cylindrical surface two adjacent and annular bands 14 and 15 of graduations, which correspond to the load values measurable with the use of the weighing apparatus and placed upon the weighing platform. The graduation values on the respective bands extend in reverse sense about the drum or cylinder surface and are observable through openings 16 and 17 formed in the upper part of the cylindrical wall of the hollow casing pillar 1. These openings 16 and 17 are formed one on the front surface and the other on the rear surface of the said cylindrical wall and are laterally staggered with respect to one another to correspond with the position of their corresponding band of graduations. The construction and arrangement is such that the same load reading at any particular moment is discernible through either opening 16 or 17 i. e. from the back or front of the pillar 1, and is read off from the indicator pointers 16a and 17a stamped out from the metal of the pillar 1 in the formation of the said openings.

Rotation of the drum or cylinder 11 is effected in unison with the oscillation of the balance beam 4 and is effective through the medium of a flexible cord wrapped around the spindle 12 and connected at one end thereof to the aforesaid ear 3b of the balance beam, the opposite end of the cord 18 being anchored to the base of the casing through the medium of an elastic link or coil spring 19 which serves to restore the drum or cylinder 11 to its normal and zero position.

The casing pillar 1 is closed on its rear face by a removable rectangular panel 20 slidable into position to close the opening 21 at the back of the casing while the base plate 22 is removed, the latter being finally secured in position as by tongues from the longitudinal edges of the side walls of the hollow base part 2 of the casing being engaged in aligned slots in the base plate and thereafter bent back, as employed in sheet metal toy constructions.

The vertical edges of the opening 21 are defined by inwardly directed flanges 23 whereas the top transverse edge is defined by an inwardly set transverse flange 24. The flanges 23 form a guide for the vertical sliding of the back panel 20 into position and when so slid into position the upper transverse edge portion of the panel overlaps the transverse flange whereas the flanges 23 overlap the vertical edge portions of the panel.

It will be appreciated from consideration of the foregoing description in conjunction with the drawings that we have provided a rotatively simple, inexpensive yet efficient construction of weighing apparatus, which can be made up almost entirely from sheet metal pressings or stampings to provide not only a toy having an instructional value but also a miniature weighing apparatus, usable to weigh relatively light articles with a reasonable degree of accuracy.

It will also be appreciated that the invention is not limited in its practical application to the precise details of construction described and shown in the drawings but that these are capable of some modification to meet particular requirements. Thus if it is preferred to construct the weighing apparatus from moldable or plastic material this is possible having regard to the general construction and formation of the parts as above described.

Having thus described our invention what we claim as novel and wish to secure by Letters Patent is as follows:

1. Toy or miniature weighing apparatus comprising in combination a hollow casing, a graduated indicator drum rotatably mounted within said casing, the latter having an opening therein revealing the indicator graduations, a weighing platform, a balance beam pivotally mounted within said casing, a vertical leg depending from said weighing platform and pivotally connected with said balance beam, said leg extending through an opening in an upper wall of said casing, a bracket in the latter pivotally supporting one end of said balance beam, the latter including a long beam and a short stabilizer link both of channel shape, said beam and link being pivotally connected to provide a parallel link motion, pivot pins pivotally mounting said beam and stabilizer link, said pivot pins extending transversely between the opposed flanges of their respective channel shape beam and link members, an elastic link within said casing connected between the balance beam and the casing and constituting a load resistance, a flexible cord connected between the balance beam and the indicator drum so as to rotate the latter with the swinging movements of the balance beam, and an elastic link connected between the indicator drum and the casing and adapted to maintain the drum normally in a zero position, the said elastic load resistance serving to restore the weighing platform to its normal elevated position.

2. Toy or miniature weighing apparatus as claimed in claim 1 wherein said beam has a laterally extending ear at one end thereof forming a connection means for one end of said flexible cord, the corresponding end of the elastic load resistance being centrally connected with said beam end.

3. Toy or miniature weighing apparatus as claimed in claim 1 wherein said platform leg is of channel formation and is disposed to embrace the beam and stabiliser link with the bridge of the channel extending traversely across the channel of the link.

VERNON D. BALLARD.
ALMON O. BALLARD.

REFERENCES CITED

The following references are of record in the file of this patent:

UNITED STATES PATENTS

| Number | Name | Date |
|---|---|---|
| 632,525 | Hansen | Sept. 5, 1899 |
| 722,618 | Pelouze | Mar. 10, 1903 |
| 1,277,698 | Cross | Sept. 3, 1918 |
| 1,578,137 | Kaplan | Mar. 23, 1926 |
| 1,872,465 | Kopp | Aug. 16, 1932 |
| 2,036,635 | Kingsbury | Apr. 7, 1936 |
| 2,228,872 | Durfee | Jan. 14, 1941 |